(12) United States Patent
Kim et al.

(10) Patent No.: US 12,278,725 B2
(45) Date of Patent: Apr. 15, 2025

(54) DEVICE AND METHOD FOR PHASE ADJUSTMENT OF RECEIVER FOR PAM SIGNALING

(71) Applicant: POINT2 TECHNOLOGY, INC., Daejeon (KR)

(72) Inventors: Taeho Kim, Seoul (KR); Hyosup Won, Seoul (KR); Jungi Jo, Incheon (KR); Kyoohyun Lim, Seoul (KR); Jake Eu, Seoul (KR); Jinho Park, Seoul (KR); Hail Song, Seoul (KR)

( * ) Notice: Subject to any disclaimer, the term of this patent is extended or adjusted under 35 U.S.C. 154(b) by 0 days.

(21) Appl. No.: 18/008,661

(22) PCT Filed: Nov. 5, 2021

(86) PCT No.: PCT/KR2021/016025
§ 371 (c)(1),
(2) Date: Dec. 6, 2022

(87) PCT Pub. No.: WO2023/080285
PCT Pub. Date: May 11, 2023

(65) Prior Publication Data
US 2024/0235920 A1    Jul. 11, 2024

(51) Int. Cl.
H04L 27/38    (2006.01)
H04L 25/49    (2006.01)
H04L 27/36    (2006.01)

(52) U.S. Cl.
CPC ............ *H04L 27/389* (2013.01); *H04L 25/49* (2013.01); *H04L 27/361* (2013.01)

(58) Field of Classification Search
CPC ..... H04L 27/389; H04L 25/49; H04L 27/361; H04L 7/033; H04L 25/02; H04L 25/4917
See application file for complete search history.

(56) References Cited

U.S. PATENT DOCUMENTS 5,959,563 A * 9/1999 Ring ................... H04L 7/0054
                                                    341/166
6,307,906 B1 * 10/2001 Tanji ..................... H04L 25/14
                                                    375/376

(Continued)

FOREIGN PATENT DOCUMENTS

KR    10-2019-0131972 A    11/2019
KR       10-2086945 B1     3/2020
KR    10-2021-0078358 A     6/2021

OTHER PUBLICATIONS

International Search Report issued in connection with corresponding PCT Patent Application No. PCT/KR2021/016025 dated Jul. 7, 2022.

*Primary Examiner* — Jean B Corrielus
(74) *Attorney, Agent, or Firm* — Dinsmore & Shohl LLP; Yongsok Choi, Esq.

(57) ABSTRACT

The present disclosure may provide a device and method for independent phase adjustment of a PAM receiver. The device includes: a plurality of samplers configured to perform sampling for signal level decision of multi-level input data; a global clock source configured to provide a common sampling clock to the samplers; and a plurality of phase adjusters configured to respectively adjust a phase of the common sampling clock to provide a sampling phase applied to a corresponding sampler. According to the present disclosure, it is possible to achieve reliable BER performance by independently adjusting a sampling phase of a sampler corresponding to each eye opening even in the presence of unsymmetric eye openings.

13 Claims, 7 Drawing Sheets

(56) References Cited

U.S. PATENT DOCUMENTS

| | | | |
|---|---|---|---|
| 9,577,816 B2* | 2/2017 | Hossain | H04L 7/033 |
| 10,277,431 B2* | 4/2019 | Tajalli | H04L 25/40 |
| 10,324,876 B2* | 6/2019 | Shokrollahi | G06F 13/4068 |
| 11,184,008 B2* | 11/2021 | Kumar | H03L 7/0807 |
| 11,201,768 B1* | 12/2021 | Lee | H04L 7/0334 |
| 2006/0274874 A1* | 12/2006 | Kumar | H04L 7/033 |
| | | | 375/362 |
| 2017/0033918 A1* | 2/2017 | Hossain | H04L 25/4917 |
| 2017/0118046 A1* | 4/2017 | Dallaire | H04L 25/03885 |
| 2021/0044416 A1 | 2/2021 | Lu | |
| 2021/0297082 A1* | 9/2021 | Wolkovitz | H03L 7/0807 |

* cited by examiner

[Fig. 1]
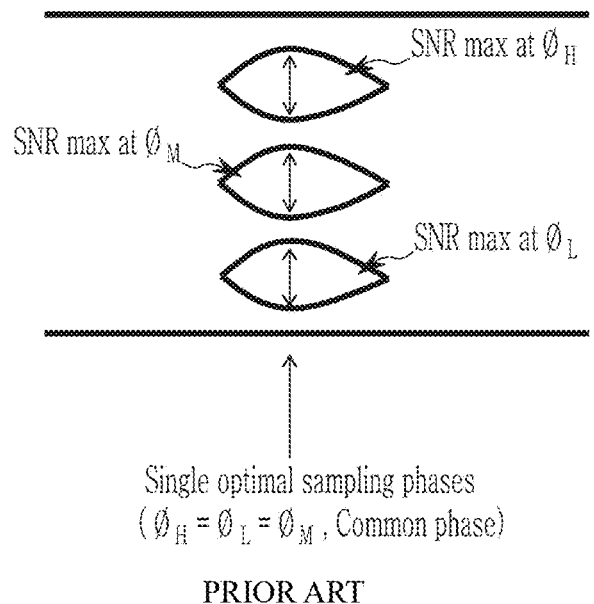
PRIOR ART
[Fig. 2]
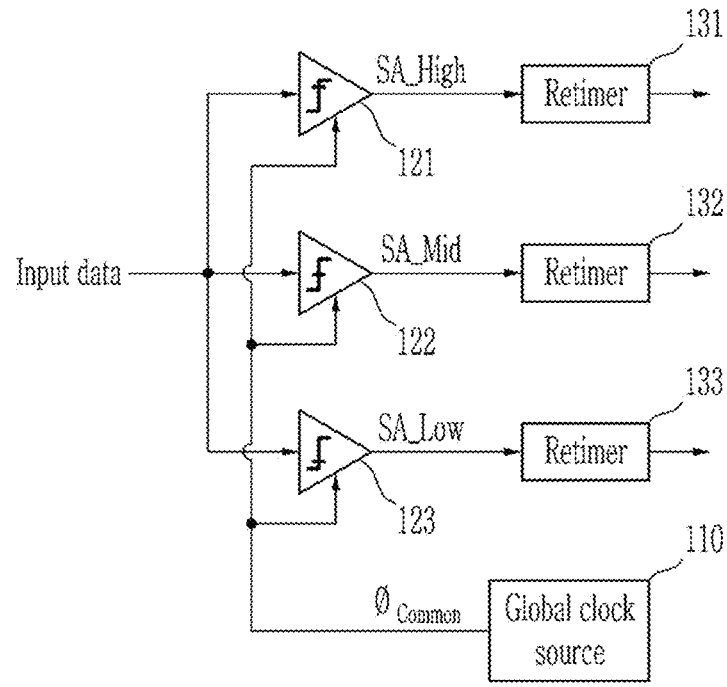
PRIOR ART

[Fig. 3]
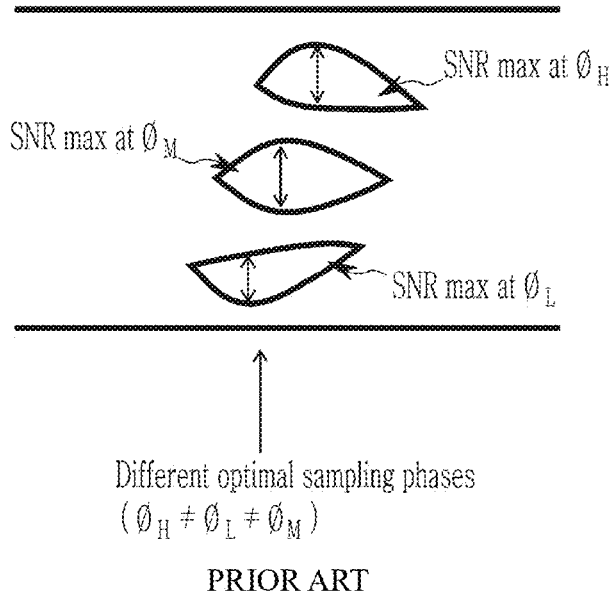
PRIOR ART
[Fig. 4]
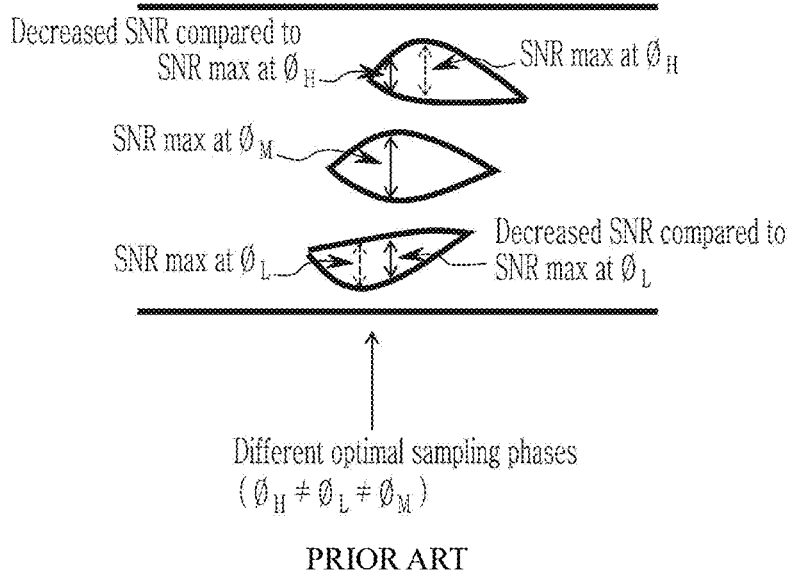
PRIOR ART

[Fig. 5]
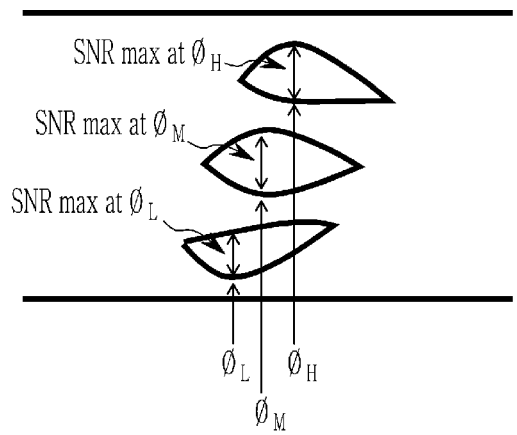
Independent sampling phases for optimal SNR
($\emptyset_H \neq \emptyset_L \neq \emptyset_M$)
[Fig. 6]
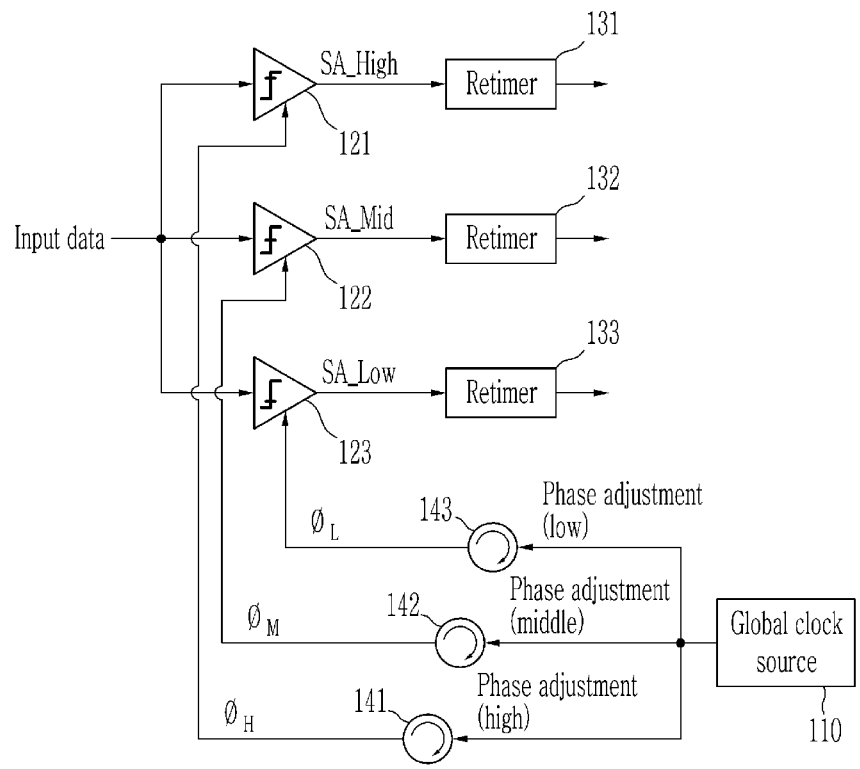

[Fig. 7]
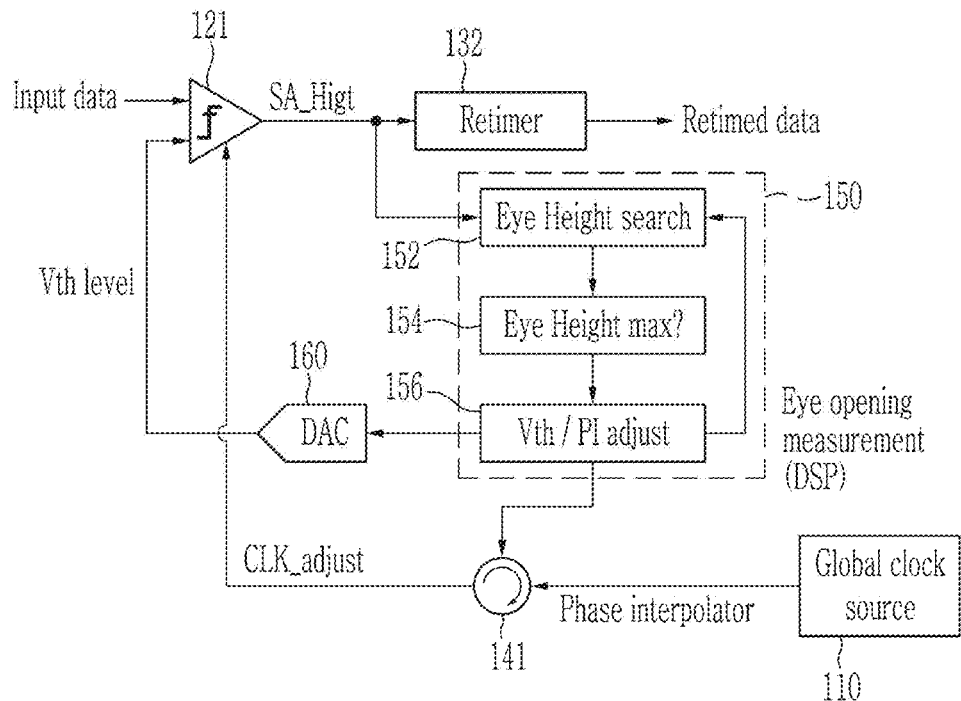
[Fig. 8]
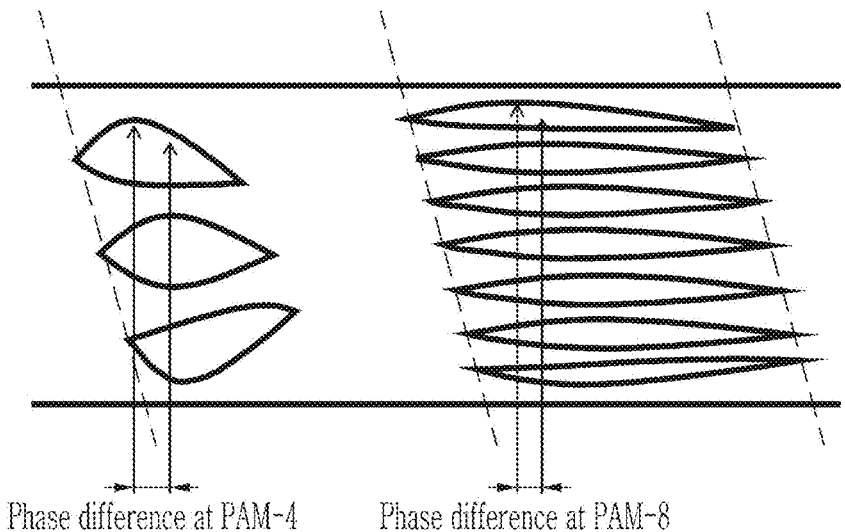
PRIOR ART

[Fig. 9]
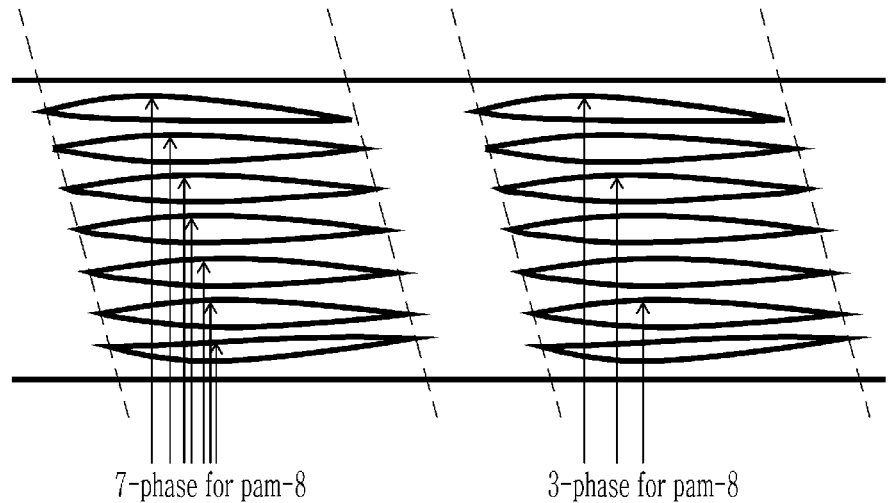
7-phase for pam-8      3-phase for pam-8
[Fig. 10]
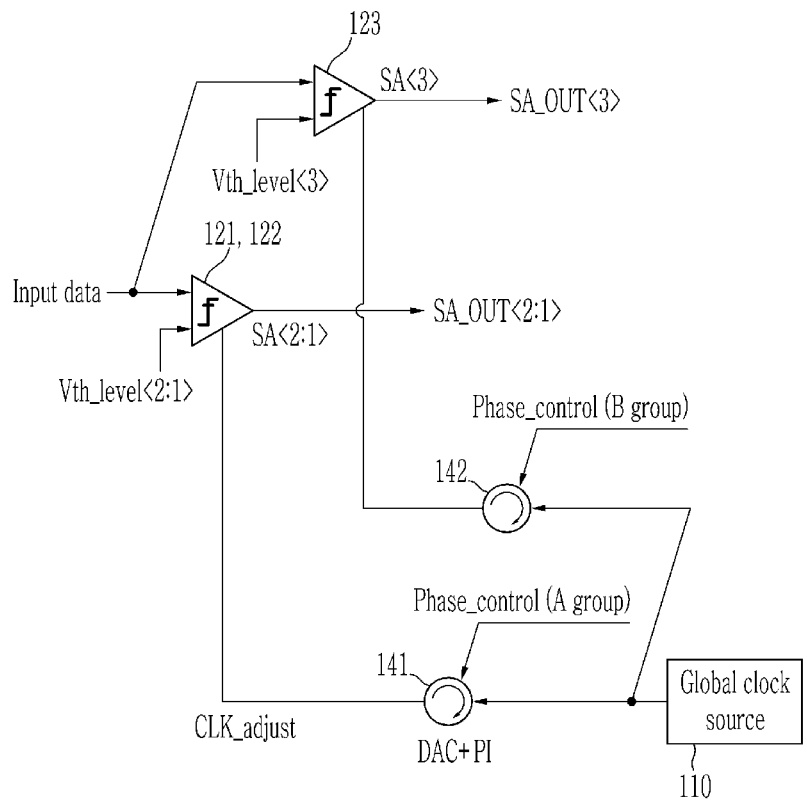

[Fig. 11]
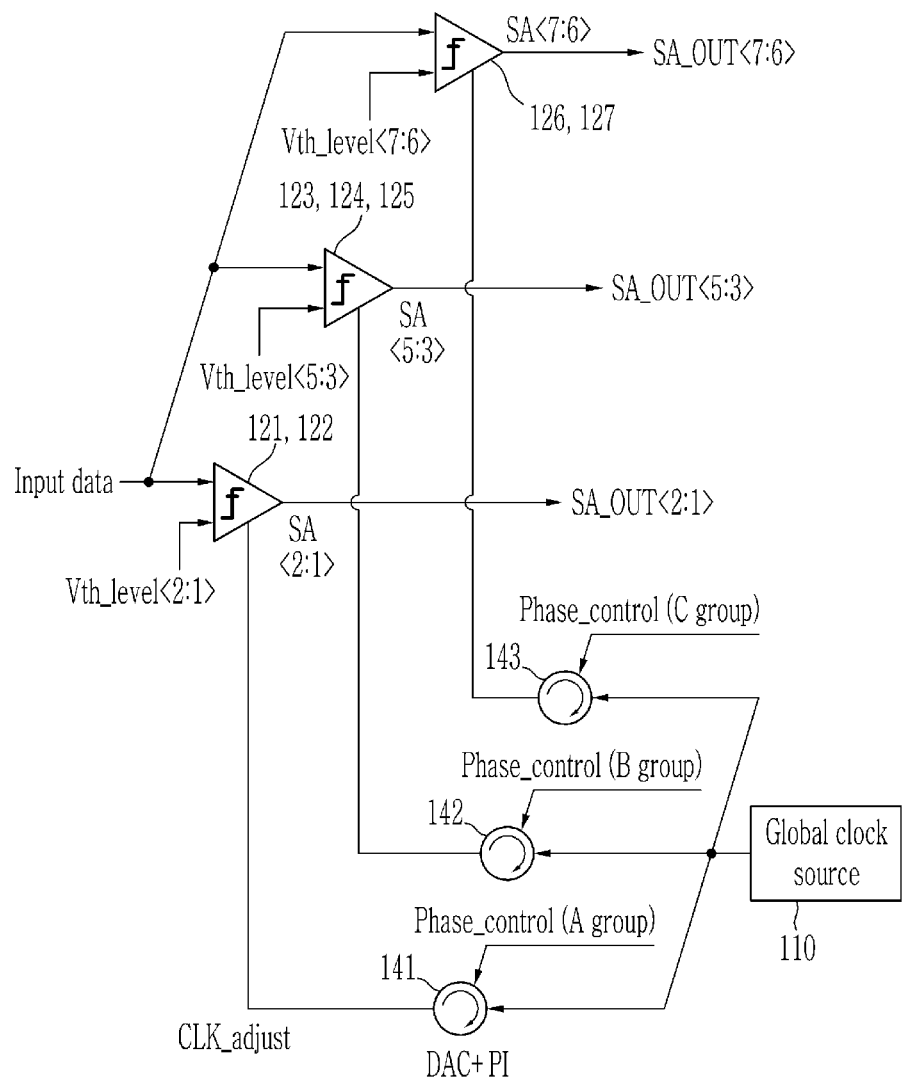

[Fig. 12]
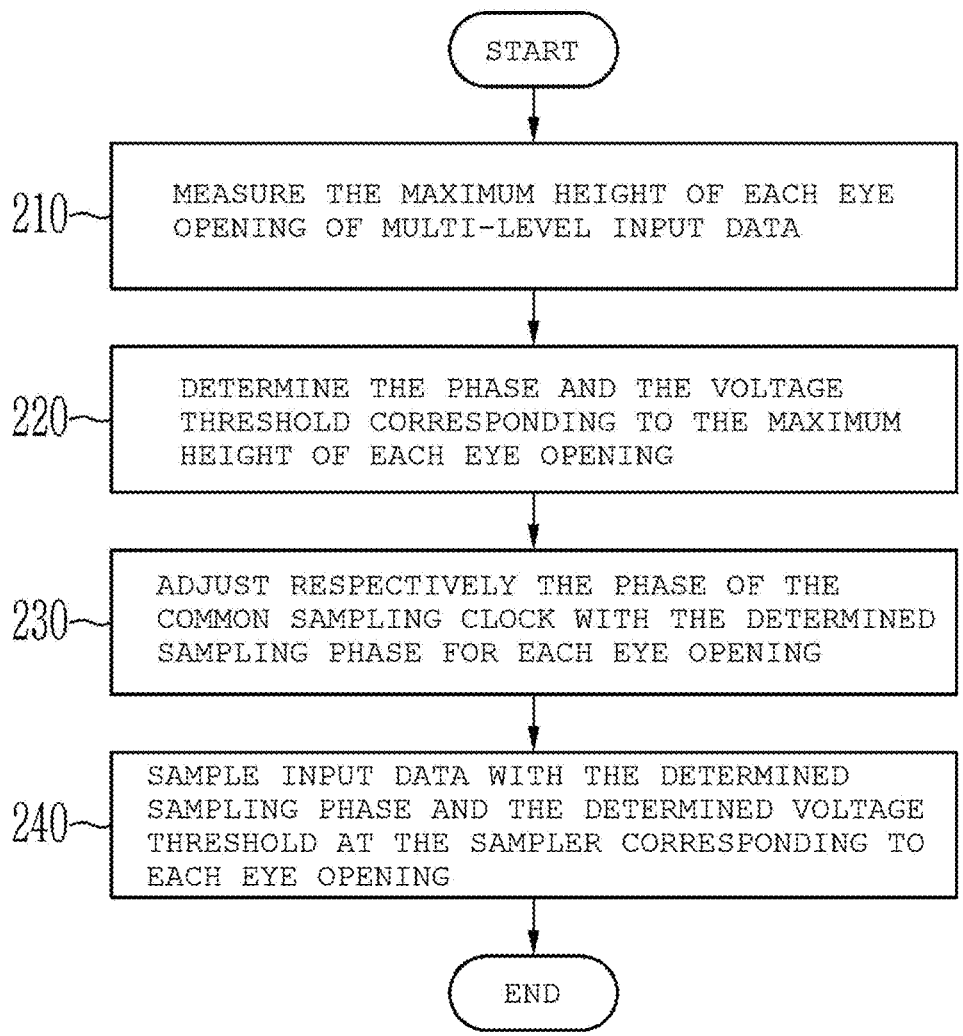

DEVICE AND METHOD FOR PHASE ADJUSTMENT OF RECEIVER FOR PAM SIGNALING

RELATED APPLICATIONS

The present invention is a U.S. National Stage under 35 USC 371 patent application, claiming priority to PCT Application No. PCT/KR2021/016025, filed on Nov. 5, 2021; the entirety of which is hereby incorporated herein by reference.

TECHNICAL FIELD

The present disclosure relates to PAM signaling, and more particularly, to a device and method for phase adjustment of a receiver for PAM signaling.

BACKGROUND ART

With the development of information and communication technology, data centers for transmitting and storing vast amounts of data are being operated, and a transmission system based on an optical interface may be applied for high-speed data transmission.

For high-speed transmission of large-capacity data, a high-efficiency multi-level signal method such as pulse amplitude modulation (PAM) may be applied. Such a multi-level signal may appear as a waveform called an eye pattern. It may be determined that the larger and clearer the eye opening of the eye pattern appears, the better the bit error rate (BER) of the signal is.

For example, when the PAM-4 modulation method is applied, three eye openings may appear, and when the PAM-8 modulation method is applied, seven eye openings may appear. The multi-level signal that may be represented by such a plurality of eye openings may have a symmetric eye opening in an ideal environment. However, due to external environmental factors such as distortion, light dispersion, deterioration in linear characteristics of optical components, and timing skew that may occur during optical-to-electrical or electrical-to-optical conversion of an optical transmission system, multi-level input data may have an unsymmetric eye opening. When sampling is not performed at an optimal phase position in the case of the unsymmetric eye opening, sampling is performed under a condition in which a signal-to-noise ratio (SNR) is reduced at a specific signal level, so there may be a problem in that the BER performance of the receiver deteriorates.

Accordingly, there is a need to develop a receiver capable of achieving reliable BER performance even in the presence of the unsymmetric eye opening.

DISCLOSURE

Technical Problem

The present disclosure provides a device and method for phase adjustment of a receiver for reliable PAM signaling.

Technical Solution

According to an embodiment of the present disclosure, there is provided a device for independent phase adjustment of a pulse amplitude modulation (PAM) receiver. The device may include: a plurality of samplers configured to perform sampling for signal level decision of multi-level input data; a global clock source configured to provide a common sampling clock to the samplers; and a plurality of phase adjusters configured to respectively adjust a phase of the common sampling clock to provide a sampling phase applied to a corresponding sampler.

The device may further include an eye opening measuring unit configured to measure maximum heights of each eye opening of a plurality of eye openings of the multi-level input data, determine a phase $\Phi$ corresponding to the maximum height of the corresponding eye opening, respectively, and respectively provide the determined phase as a sampling phase to the phase adjuster corresponding to the corresponding eye opening.

The eye opening measurement unit may be configured to respectively determine a voltage threshold Vth based on the maximum height of the corresponding eye opening, and respectively provide the determined voltage threshold to the sampler corresponding to the corresponding eye opening.

The eye opening measurement unit may be configured to determine the phase $\Phi$ and the voltage threshold Vth corresponding to the maximum heights of each of the eye openings, respectively, by determining an expected phase range for phase search corresponding to the maximum height for the corresponding eye opening, calculating an eye height at each phase by counting an output value through voltage threshold adjustment for each phase at a predetermined interval from a minimum value phase to a maximum value phase of the expected phase range, and determining a phase value having the corresponding eye opening of the maximum height among the calculated eye heights.

The multi-level input data may be PAM-4 input data, The plurality of samplers may include a first sampler for determining a signal level of a first eye opening, a second sampler for determining a signal level of a second eye opening, and a third sampler for determining a signal level of a third eye opening. The plurality of phase adjusters may include a first phase adjuster providing a first sampling phase applied to the first sampler, a second phase adjuster providing a second sampling phase applied to the second sampler, and a third phase adjuster applied to the third sampler.

In addition, when processing multi-level PAM-N signals (e.g., PAM-4, PAM-8, PAM-16, PAM-32, etc.) such as PAM-N input data, a PAM receiver may be implemented to group a plurality of samplers and apply a sampling phase with one phase adjuster per group to reduce the complexity of the receiver structure and reduce power consumption.

In this case, the number of phase adjusters applied to the PAM receiver may be less than the number of samplers, and two or more of the samplers may be set as a group, and one phase adjuster corresponding to the group may provide a sampling phase to the samplers of the group.

For example, the multi-level input data may be PAM-4 input data. In this case, the plurality of samplers may include a first sampler for determining a signal level of a first eye opening, a second sampler for determining a signal level of a second eye opening, and a third sampler for determining a signal level of a third eye opening. The plurality of phase adjusters may include a first phase adjuster providing a first sampling phase applied to the first sampler and the second sampler, and a second phase adjuster providing a second sampling phase applied to the third sampler.

For example, the multi-level input data may be PAM-8 input data. The plurality of samplers may include: a first sampler for determining a signal level of a first eye opening; a second sampler for determining a signal level of a second eye opening; a third sampler for determining a signal level of a third eye opening; a fourth sampler for determining a signal level of a fourth eye opening; a fifth sampler for determining a signal level of a fifth eye opening; a sixth sampler for determining a signal level of a sixth eye opening; and a seventh sampler for determining a signal level of a seventh eye opening. The plurality of phase adjusters may include: a first phase adjuster providing a first sampling phase applied to the first sampler and the second sampler; a second phase adjuster providing a second sampling phase applied to the third sampler, the fourth sampler, and the fifth sampler; and a third phase adjuster providing a third sampling phase applied to the sixth sampler and the seventh sampler.

According to an embodiment of the present disclosure, there is provided a method of independent phase adjustment of a PAM receiver including a plurality of samplers and a plurality of phase adjusters. The method may include: determining a maximum height of each eye opening of a plurality of eye openings of multi-level input data; determining respectively a phase corresponding to the maximum height of each eye opening; adjusting respectively a phase of a common sampling clock provided from a global clock source to a determined phase in a phase adjuster corresponding to each eye opening; and sampling the multi-level input data by a sampler corresponding to each phase adjuster using the adjusted phase as a sampling phase.

Advantageous Effects

According to the present disclosure, it is possible to achieve reliable BER performance by independently adjusting a sampling phase of a sampler corresponding to each eye opening even in the presence of unsymmetric eye openings.

In addition, according to the present disclosure, it is possible to reduce complexity of a receiver structure and reduce power consumption while substantially achieving the same performance by grouping and processing phases of adjacent samplers when processing multi-level PAM-N signals.

In addition, according to the present disclosure, since there is an effect being capable of compensating for distortion for performance optimization of a transmitter inside a receiver without correction in the transmitter when an unsymmetric received signal exists, it is possible to reduce a calibration work time for optimizing the performance of the transmitter.

In addition, according to the present disclosure, since it is possible to set an optimal sampling phase for a sampler operation, it is possible to implement a receiver structure insensitive to PVT fluctuations.

DESCRIPTION OF DRAWINGS

FIG. 1 is an exemplary diagram illustrating an eye pattern of a PAM-4 waveform in an ideal environment.

FIG. 2 is a diagram schematically illustrating a configuration of an exemplary receiver for PAM-4 signaling.

FIG. 3 is an exemplary diagram illustrating a PAM-4 waveform in an environment where an unsymmetric eye opening occurs.

FIG. 4 is an exemplary diagram illustrating measuring SNR at a common sampling phase in an unsymmetric eye opening waveform of FIG. 3.

FIG. 5 is an exemplary diagram illustrating measuring SNR at independent sampling phases in the unsymmetric eye opening waveform of FIG. 3.

FIG. 6 is a schematic diagram illustrating a device for independent phase adjustment of a PAM receiver according to an embodiment of the present disclosure.

FIG. 7 is a schematic diagram illustrating some configurations of the device of FIG. 6 including an eye opening measurement unit according to an embodiment of the present disclosure.

FIG. 8 is an exemplary diagram illustrating a difference in a phase value having a maximum value of adjacent eye openings in a PAM-4 waveform and a PAM-8 waveform in the environment in which the unsymmetric eye opening occurs.

FIG. 9 is an exemplary diagram illustrating an example of applying an individual sampling phase and a group sampling phase to a PAM-8 waveform having an unsymmetric eye opening.

FIG. 10 is a schematic diagram illustrating a device for independent phase adjustment for group sampling of a PAM-4 receiver according to another embodiment of the present disclosure.

FIG. 11 is a schematic diagram illustrating a device for independent phase adjustment for group sampling of a PAM receiver according to another embodiment of the present disclosure.

FIG. 12 is a schematic flowchart illustrating an independent phase adjustment method of a PAM receiver according to an embodiment of the present disclosure.

DETAILED DESCRIPTION

Hereinafter, exemplary embodiments of the present invention will be described in detail with reference to the accompanying drawings. First, it is to be noted that in giving reference numerals to components of each of the accompanying drawings, the same components will be denoted by the same reference numerals even though they are illustrated in different drawings. Further, in describing exemplary embodiments in the present disclosure, when it is determined that a detailed description of a related known configuration or function may obscure the gist of the present disclosure, the detailed description will be omitted.

Various aspects of the present disclosure will be described below It is to be understood that the inventions presented herein may be implemented in a wide variety of forms and that any specific structure, functions, or both, presented herein are exemplary only. Based on the inventions presented herein, those of ordinary skill in the art may understand that one aspect presented herein may be implemented independently of any other aspects, and that two or more of these aspects may be combined in various ways. For example, an apparatus may be implemented or a method may be practiced using any number of aspects set forth herein. In addition, such an apparatus may be implemented or such a method may be practiced using other structures, functions, or structures and functionality in addition to or other than one or more aspects described herein.

The present disclosure may be applied to a receiver for optical communication, but is not limited thereto, and may be applied to various communication devices for pulse amplitude modulation (PAM) signaling. In addition, although PAM-4 or PAM-8 signaling is exemplified below for convenience of description, it will be fully understood by those skilled in the art that the present disclosure is not limited thereto and can be applied to signaling of various PAM-N schemes.

FIG. 1 is an exemplary diagram illustrating an eye pattern of a PAM-4 waveform in an ideal environment.

The PAM-4 signal may transmit two information bits and may have an eye pattern having three eye openings. As illustrated in FIG. 1, in an ideal environment where there is no distortion of an input signal, all eye openings may be symmetrically aligned to the same phase, and an input signal may be sampled to have an optimal SNR (i.e. maximum SNR or maximum eye height) for all signal levels with a common single phase ($\Phi_H=\Phi_M=\Phi_L$) in phase, thereby achieving a minimum BER.

FIG. 2 is a diagram schematically illustrating a configuration of an exemplary receiver for PAM-4 signaling.

As illustrated in FIG. 2, a global clock source 110 may provide a common sampling clock to samplers 121, 122, and 123, and a common phase common may be input to each sampler as a sampling phase. The sampler 121 may sample an upper eye opening illustrated in FIG. 1, the sampler 122 may sample a middle eye opening illustrated in FIG. 1, and the sampler 123 may sample a lower eye opening illustrated in FIG. 1. Retimers 131, 132, and 133 may receive a signal sampled by each of the samplers 121, 122, and 123 and generate a retimed output signal.

FIG. 3 is an exemplary diagram illustrating a PAM-4 waveform in an environment where an unsymmetric eye opening occurs.

The multi-level input signal input to the PAM receiver may have unsymmetric eye opening due to a signal distortion caused by external environmental factors such as optical dispersion that may be caused by optical fibers and skew that may be caused by non-linear characteristics of optical components (ROSA, TOSA, etc.). As illustrated in FIG. 3, depending on the signal distortion, the unsymmetric eye opening may not only have a non-uniform shape of the eye opening, but may also have different phases with an optimal SNR (i.e., maximum SNR) (i.e., $\Phi_H \neq \Phi_M \neq \Phi_L$).

FIG. 4 is an exemplary diagram illustrating measuring SNR at a common sampling phase in an unsymmetric eye opening waveform of FIG. 3.

As illustrated in FIG. 4, in the unsymmetric eye opening waveform of FIG. 3, when a specific phase (e.g., phase $\Phi_M$ in which the middle eye opening has the maximum SNR) is a common sampling phase, each of the upper eye opening and the lower eye opening has a reduced SNR than when sampling in the phases $\Phi_H$ and $\Phi_L$ having their maximum SNR, thereby causing an SNR penalty. The larger the SNR penalty, the larger the BER, which may deteriorate the performance of the PAM receiver.

FIG. 5 is an exemplary diagram illustrating measuring SNR at independent sampling phases in the unsymmetric eye opening waveform of FIG. 3.

In the unsymmetric eye opening waveform of FIG. 3, the upper, middle, and lower eye openings may have different phases $\Phi_H$, $\Phi_M$, and $\Phi_L$ with the maximum SNR. Therefore, when an independent sampling phase may be applied to each eye opening, as illustrated in FIG. 5, the PAM receiver may independently sample the upper, middle and lower eye openings at the phases $\Phi_H$, $\Phi_M$, and $\Phi_L$ with the maximum SNR, thereby maximizing the BER performance even when the multi-level input data has the unsymmetric eye opening.

FIG. 6 is a schematic diagram illustrating a device for independent phase adjustment of a PAM receiver according to an embodiment of the present disclosure.

Such a device may include a plurality of samplers SA 121, 122, and 123, a global clock source CLK 110, a plurality of phase adjusters PI 141, 142, and 143, and a plurality of retimers 131, 132, and 133 for independent sampling phase adjustment illustrated in FIG. 5.

The plurality of samplers 121, 122, and, 123 may be configured to perform sampling for signal level decision of the multi-level input data input to the PAM receiver. The retimers 131, 132, and 133 may receive the signal sampled by each of the samplers 121, 122, and 123 and generate the retimed output signal. The global clock source 110 may be configured to provide a common sampling clock to samplers 121, 122, and 123. The plurality of phase adjusters 141, 142, and 143 may be configured to respectively adjust a phase of a common sampling clock to provide a sampling phase applied to a corresponding sampler.

For convenience of description, the multi-level input data may be PAM-4 input data. In this case, as illustrated in FIG. 6, the PAM receiver may include three samplers 121, 122, and 123 and three phase adjusters 141, 142, and 143.

The first sampler 121 may perform sampling to determine the signal level of the upper eye opening of FIG. 5, and the second sampler 122 may perform sampling to determine the signal level of the middle eye opening of FIG. 5, and the third sampler 123 may perform sampling to determine the signal level of the lower eye opening of FIG. 5. The first phase adjuster 141 may provide the first sampling phase $\Phi_H$ applied to the first sampler 121, the second phase adjuster 142 may provide the second sampling $\Phi_M$ applied to the second sampler 122, and the third phase adjuster 143 may provide $\Phi_L$ applied to the third sampler 123. The first sampling phase, the second sampling phase, and the third sampling phase may each be determined as a phase having the maximum SNR (i.e., the eye opening having the maximum height) at the corresponding eye opening. To this end, the device of FIG. 6 may perform eye opening measurement for determining an optimal phase, which will be described later with reference to FIG. 7.

FIG. 7 is a schematic diagram illustrating some configurations of the device of FIG. 6 including an eye opening measurement unit according to an embodiment of the present disclosure.

As illustrated in FIG. 7, the device for independent phase adjustment of a PAM receiver may include an eye opening measurement unit 150. The eye opening measurement unit 150 may be configured to determine the maximum heights of each eye opening of the plurality of eye openings of the multi-level input data, determine the phase $\Phi$ corresponding to the maximum height of the corresponding eye opening, respectively, and provide the determined phase as a sampling phase to the phase adjusters 141, 142, and 143 corresponding to the corresponding eye opening, respectively. In addition, the eye opening measurement unit 150 may be configured to respectively determine a voltage threshold Vth based on the maximum height of the corresponding eye opening, and respectively provide the determined voltage threshold to the samplers 121, 122, and 123 corresponding to the corresponding eye opening.

According to an implementation, the eye opening measurement unit 150 may include a plurality of eye opening measurement blocks (e.g., DSP blocks) connected to each sampler or one eye opening measurement for sequentially performing eye opening measurement on individual samplers to simultaneously perform eye opening measurements on the plurality of samplers 121, 122, and 123.

For convenience of description, as illustrated in FIG. 7, the eye opening measurement unit 150 connected to one sampler 121 and one phase adjuster 141 will be described.

The eye opening measurement unit 150 may include an eye height search unit 152, a maximum height determination unit 154, and an adjusting unit 156. The eye opening search unit 152 may determine an expected phase range for the phase search corresponding to the maximum height of the eye opening corresponding to the sampler 121. For example, the expected phase range may be set as the entire eye opening length (i.e., from the left start point to the right end point of the eye opening) or a partial length (e.g., a preset length including the middle point of the length) of the entire eye opening length. The eye opening search unit 152 may search for eye heights in various phases within the expected phase range. To this end, the eye opening search unit 152 may calculate the eye height in each phase by counting the output value through the voltage threshold adjustment for each phase at a predetermined interval from the minimum phase to the maximum phase of the expected phase range. For example, since a positive output value (e.g., 1) may be output when a signal voltage value is greater than the voltage threshold and a negative output value (e.g., 0) may be output when the signal voltage value is lower than the voltage threshold, it is possible to calculate an eye height in a specific phase by calculating a difference between a position at which a negative output value appears by a predetermined probability (i.e., the highest position in a specific phase) and a position at which a positive output value appears by a predetermined probability (i.e., the lowest position in a specific phase) while adjusting the voltage threshold on a specific phase).

The maximum height determination unit 154 may determine the maximum height among the eye heights calculated from the phase set values within the expected phase range as the maximum height of the corresponding eye opening. The adjusting unit 156 may determine the phase Φ and the voltage threshold Vth corresponding to the maximum height of the corresponding eye opening. For example, the voltage threshold Vth corresponding to the maximum height of the eye opening may be determined as a voltage value corresponding to a midpoint of the maximum height. The adjusting unit 156 may transmit the determined phase Φ to the phase adjuster 141 to be adjusted as the sampling phase for the sampler 121, and the determined voltage threshold Vth may be transmitted to the sampler 121 through the digital-to-analog converter (DAC) 160 so that the determined voltage threshold Vth may be a reference value for determining the signal level at the sampler 121.

In another implementation, the multi-level input data input to the PAM receiver may be PAM-8 input data.

In this case, the PAM-8 input signal may transmit three information bits and have an eye pattern having seven eye openings. In this case, the PAM receiver may be configured to include seven samplers for the signal level decision of the seven eye openings and seven phase adjusters capable of providing each sampler with an independently adjustable sampling phase.

In another implementation, when processing multi-level PAM-N signals (e.g., PAM-4, PAM-8, PAM-16, PAM-32, etc.) such as PAM-N input data, the PAM receiver may be implemented to apply a sampling phase using one phase adjuster per group by grouping a plurality of samplers to reduce the complexity of the receiver structure and reduce power consumption, which will be described later.

FIG. 8 is an exemplary diagram illustrating a difference in a phase value having a maximum value of adjacent eye openings in a PAM-4 waveform and a PAM-8 waveform in the environment in which the unsymmetric eye opening occurs.

As described above, in the unsymmetric eye opening environment, each eye opening may have a maximum SNR at a different phase, and as the modulation level of the PAM signal increases, the optimal phase difference between adjacent eye openings may decrease, and accordingly, the SNR penalty from phase difference may also be reduced. For example, as illustrated in FIG. 8, an optimal phase difference between adjacent eye openings in the PAM-8 signal becomes smaller than an optimal phase difference between adjacent eye openings in the PAM-4 signal.

FIG. 9 is an exemplary diagram illustrating an example of applying an individual sampling phase and a group sampling phase to a PAM-8 waveform having an unsymmetric eye opening.

As illustrated in FIG. 9, in an embodiment in which one phase adjuster provides a sampling phase to one sampler (left side of FIG. 9), seven phase adjusters may be applied to the PAM-8 signal. On the other hand, in the implementation on the right side of FIG. 9, when the phase difference between adjacent eye openings is small according to the optical interworking environment, seven eye openings are grouped into three groups (for example, a first group of first and second eye openings, second group of third, fourth, and fifth eye openings, third group of sixth and seventh eye openings), and one phase adjuster is applied to each group, and thus, three phase adjuster may be applied. The implementation of the right side of FIG. 9 can reduce the complexity of the PAM receiver and reduce power consumption by applying the reduced number of phase adjusters while minimizing the deterioration in the BER performance with the reduced SNR penalty.

Similarly, the same grouping may be applied to the PAM-4 signal. As illustrated in FIG. 6, in the implementation in which one phase adjuster provides a sampling phase to one sampler, three phase adjusters may be applied to the PAM-4 signal. On the other hand, when the phase difference between adjacent eye openings is small according to the optical interworking environment, by applying one phase adjuster by grouping two of the three eye openings (for example, the first and second eye openings or the second and third eye openings) for the PAM-4 signal, two phase adjusters may be applied to three samplers.

FIG. 10 is a schematic diagram illustrating a device for independent phase adjustment of a PAM-4 receiver according to another embodiment of the present disclosure.

FIG. 10 illustrates a configuration of an exemplary device for applying a group sampling phase in the same manner as in the embodiment on the right side of FIG. 9, and multi-level input data input to the device may be the PAM-4 input data.

As illustrated in FIG. 10, the plurality of samplers includes a first sampler 121 for determining a signal level of a first eye opening, a second sampler 122 for determining a signal level of a second eye opening, and a third sampler 123 for determining a signal level of a third eye opening.

The first sampler 121 and the second sampler 122 may be set to a first group (i.e., group A), and the first phase adjuster 141 may provide a first sampling phase applied to the first group. The third sampler 123 may be set as a second group (i.e., group B), and the second phase adjuster 142 is a second sampling phase applied to the second group (i.e., the third sampler 123).

In addition, the first sampling phase may be determined as a phase corresponding to a maximum height of one of the first eye opening and the second eye opening. The sampling phase for each group may be determined by the eye opening measurement unit 150 connected to the phase adjusters 141 and 142 of each group. In addition, depending on the implementation, the grouping setting is not limited to the example of FIG. 10, and groupings having different configurations (e.g., the first group of the first sampler 121, and the second group of the second sampler 122 and the third sampler 123) can also be configured.

FIG. 11 is a schematic diagram illustrating a device for independent phase adjustment for group sampling of a PAM-8 receiver according to another embodiment of the present disclosure.

FIG. 11 illustrates a configuration of an exemplary device for applying a group sampling phase as in the implementation on the right side of FIG. 9, and the multi-level input data input to the device may be the PAM-8 input data.

As illustrated in FIG. 11, the plurality of samplers may include the first sampler 121 for determining the signal level of the first eye opening, the second sampler 122 for determining the signal level of the second eye opening, the third sampler 123 for determining the signal level of the third eye opening, a fourth sampler 124 for determining a signal level of a fourth eye opening, a fifth sampler 125 for determining a signal level of a fifth eye opening, a sixth sampler 126 for determining a signal level of a sixth eye opening, and a seventh sampler 127 for determining a signal level of a seventh eye opening.

The first sampler 121 and the second sampler 122 may be set to a first group (i.e., group A), and the first phase adjuster 141 may provide a first sampling phase applied to the first group. The third sampler 123, the fourth sampler 124, and the fifth sampler 125 may be set as the second group (i.e., group B), and the second phase adjuster 142 may provide the second sampling phase applied to the second group. The sixth sampler 126 and the seventh sampler 127 may be set to the third group (i.e., group C), and the third phase adjuster 143 may provide the third sampling phase applied to the third group.

Also, the first sampling phase may be determined as a phase corresponding to a maximum height of one of the first eye opening and the second eye opening, the second sampling phase may be determined as a phase corresponding to a maximum height of one of the third eye opening, the fourth eye opening, and the fifth eye opening, and the third sampling phase may be determined as a phase corresponding to a maximum height of one of the sixth eye opening and the seventh eye opening. The sampling phase for each group may be determined by the eye opening measurement unit 150 connected to the phase adjusters 141, 142, and 143 of each group.

In addition, depending on the implementation, the grouping setting is not limited to the example of FIG. 10, and grouping (e.g., three samplers-three samplers-one sampler configuration, etc.) having different configurations or a different number of phase adjusters (e.g., four phase adjusters for defining four groups) can also be configured.

FIG. 12 is a schematic flowchart illustrating an independent phase adjustment method of a PAM receiver according to an embodiment of the present disclosure.

As illustrated in FIG. 12, in the method of independent phase adjustment of a PAM receiver including a plurality of samplers and a plurality of phase adjusters, the eye opening measurement unit 150 of the receiver may measure a respective maximum height of each of the plurality of eye openings of the multi-level input data (210). The eye opening measurement unit 150 of the receiver may respectively determine a phase and a voltage threshold corresponding to the determined maximum height of each eye opening (220). Each of the phase adjusters 141, 142, and 143 of the receiver may adjust a phase of a common sampling clock provided from a global clock source to the sampling phase determined for each eye opening (230). Each of the samplers 121, 122, and 123 of the receiver may sample the multi-level input data with the determined sampling phase and the determined voltage threshold (240).

As described above, the device for independent phase adjustment of a PAM receiver and method of the present disclosure may achieve reliable BER performance by independently adjusting the sampling phase of the sampler corresponding to each eye opening even in the situation where there are the unsymmetric eye openings. In addition, in a multi-phase sampling method such as PAM, an inter-phase error may also occur due to process, voltage and temperature (PVT) fluctuations, but in the present disclosure, the optimal sampling phase for the sampler operation may be set for such unsymmetric phase error, so the present disclosure may implement a receiver structure that is insensitive to the PVT fluctuations.

It is to be understood that any specific order or hierarchical structure of steps in any presented processes is an example of exemplary approaches. Based on design priorities, it is to be understood that the specific order or hierarchical structure of steps in the processes may be rearranged within the scope of the present invention. The appended method claims present elements of various steps in an exemplary order, but are not meant to be limited to the specific order or hierarchical structure presented.

The terms used herein "component," "unit (or part)," "module," "system," and the like, may refer to a computer-related entity, hardware, firmware, software, a combination of software and hardware, or execution of software. For example, the apparatus and components described herein may be implemented using one or more general purpose or special purpose computing devices, such as a processor, a controller, a digital signal processor (DSP), a field programmable gate array (FPGA), a programmable logic unit (PLU), and a microprocessor etc. For example, a component may be, but is not limited to being, a process running on a processor, a processor, an object, an execution thread, a program, and/or a computer. For example, both an application running on a computing device and the computing device may be a component. One or more components may reside within a processor and/or an execution thread, and one component may be localized within one computer, or distributed between two or more computers. In addition, these components may be executed from various computer-readable media having various data structures stored therein.

The description of the presented embodiments is provided to enable any person skilled in the art to use or practice the present invention. Various modifications to these embodiments will be readily apparent to those skilled in the art, and the generic principles defined herein may be applied to other embodiments without departing from the scope of the invention. Thus, the present invention should not be limited to the embodiments presented herein but should be construed in the widest scope consistent with the principles and novel features presented herein.

DESCRIPTION OF REFERENCE SIGNS

110: Global clock source
121, 122, 123, 124, 125, 126, 127: Sampler
131, 132, 133: Retimer
141, 142, and 143: Phase adjuster
150: Eye opening measurement unit
152: Eye height search unit
154: Maximum height determination unit
156: Adjusting unit

The invention claimed is:

1. A device for independent phase adjustment of a pulse amplitude modulation (PAM) receiver, the device comprising:

a plurality of samplers configured to perform sampling for signal level decision of multi-level input data;
a global clock source configured to provide a common sampling clock to the samplers;
a plurality of phase adjusters configured to respectively adjust a phase of the common sampling clock to provide a sampling phase applied to a corresponding sampler; and
an eye opening measurement unit configured to measure a maximum height of each eye opening of a plurality of eye openings of the multi-level input data, determine a phase $\Phi$ corresponding to the maximum height of the corresponding eye opening, respectively, and respectively provide the determined phase as a sampling phase to the phase adjuster corresponding to the corresponding eye opening.

2. The device of claim 1, wherein the eye opening measurement unit is configured to respectively determine a threshold voltage Vth based on the maximum height of the corresponding eye opening, and respectively provide the determined threshold voltage to the sampler corresponding to the corresponding eye opening.

3. The device of claim 2, wherein the eye opening measurement unit is configured to determine the phase $\Phi$ and the threshold voltage Vth corresponding to the maximum height of each of the eye openings, respectively, by determining an expected phase range for phase search corresponding to the maximum height for the corresponding eye opening, calculating an eye height at each phase by counting an output value through threshold voltage adjustment for each phase at a predetermined interval from a minimum value phase to a maximum value phase of the expected phase range, and determining a phase value having the corresponding eye opening of the maximum height among the calculated eye heights.

4. The device of claim 1, wherein the multi-level input data is PAM-4 input data,
the plurality of samplers includes a first sampler for sampling a signal level of a first eye opening, a second sampler for sampling a signal level of a second eye opening, and a third sampler for sampling a signal level of a third eye opening, and
the plurality of phase adjusters includes first phase adjuster providing a first sampling phase applied to the first sampler, a second phase adjuster providing a second sampling phase applied to the second sampler, and a third phase adjuster applied to the third sampler.

5. A device for independent phase adjustment of a pulse amplitude modulation (PAM) receiver, the device comprising:
a plurality of samplers configured to perform sampling for signal level decision of multi-level input data;
a global clock source configured to provide a common sampling clock to the samplers; and
a plurality of phase adjusters configured to respectively adjust a phase of the common sampling clock to provide a sampling phase applied to a corresponding sampler;
wherein the number of phase adjusters is less than the number of samplers, and
two or more of the samplers are set as a group, and one phase adjuster corresponding to the group provides a sampling phase to the samplers of the group.

6. The device of claim 5, wherein the multi-level input data is PAM-4 input data,
the plurality of samplers includes a first sampler for sampling a signal level of a first eye opening, a second sampler for sampling a signal level of a second eye opening, and a third sampler for sampling a signal level of a third eye opening, and
the plurality of phase adjusters includes a first phase adjuster providing a first sampling phase applied to the first sampler and the second sampler, and a second phase adjuster providing a second sampling phase applied to the third sampler.

7. The device of claim 5, wherein the multi-level input data is PAM-8 input data,
the plurality of samplers includes:
a first sampler for sampling a signal level of a first eye opening;
a second sampler for sampling a signal level of a second eye opening;
a third sampler for sampling a signal level of a third eye opening;
a fourth sampler for sampling a signal level of a fourth eye opening;
a fifth sampler for sampling a signal level of a fifth eye opening;
a sixth sampler for sampling a signal level of a sixth eye opening; and
a seventh sampler for sampling a signal level of a seventh eye opening, and
the plurality of phase adjusters include:
a first phase adjuster providing a first sampling phase applied to the first sampler and the second sampler;
a second phase adjuster providing a second sampling phase applied to the third sampler, the fourth sampler, and the fifth sampler; and
a third phase adjuster providing a third sampling phase applied to the sixth sampler and the seventh sampler.

8. A method of independent phase adjustment of a pulse amplitude modulation (PAM) receiver including a plurality of samplers and a plurality of phase adjusters, the method comprising:
determining a maximum height of each eye opening of a plurality of eye openings of multi-level input data;
determining respectively a phase corresponding to the maximum height of each eye opening;
adjusting respectively a phase of a common sampling clock provided from a global clock source to a determined phase in a phase adjuster corresponding to each eye opening; and
sampling the multi-level input data by a sampler corresponding to each phase adjuster using the adjusted phase as a sampling phase.

9. The method of claim 8, wherein the determining respectively the phase corresponding to the maximum height of each eye opening comprises determining respectively a threshold voltage for each eye opening based on the maximum height of each eye opening, and
the sampling the multi-level input data comprises sampling the multi-level input data based on the sampling phase and the threshold voltage.

10. The method of claim 8, wherein the determining the maximum height of each eye opening comprises:
determining an expected phase range for phase search corresponding to the maximum height for a corresponding eye opening;
calculating an eye height at each phase by counting an output value through threshold voltage adjustment for each phase at a predetermined interval from a minimum value phase to a maximum value phase of the expected phase range; and determining a maximum height among the calculated eye heights as the maximum height of the corresponding eye opening.

11. The method of claim 8, wherein the multi-level input data is PAM-4 input data, the plurality of eye openings includes a first eye opening, a second eye opening, and a third eye opening, the sampling phases includes a first sampling phase, a second sampling phase, and a third sampling phase, and the determining respectively the phase corresponding to the maximum height of each eye opening comprises determining the first sampling phase, the second sampling phase, and the third sampling phase.

12. The method of claim 8, wherein the multi-level input data is PAM-4 input data, and the plurality of eye openings includes a first eye opening, a second eye opening, and a third eye opening, the sampling phases include a first sampling phase and a second sampling phase, and the first sampling phase is a phase corresponding to a maximum height of one of the first eye opening and the second eye opening.

13. The method of claim 8, wherein the multi-level input data is PAM-8 input data the plurality of eye openings includes:
a first eye opening;
a second eye opening;
a third eye opening;
a fourth eye opening;
a fifth eye opening;
a sixth eye opening; and
a seventh eye opening, and the sampling phases include:
a first sampling phase;
a second sampling phase; and
a third sampling phase, and the first sampling phase is a phase corresponding to a maximum height of one of the first eye opening and the second eye opening, the second sampling phase is a phase corresponding to a maximum height of one of the third eye opening, the fourth eye opening, and the fifth eye opening, and the third sampling phase is a phase corresponding to a maximum height of one of the sixth eye opening and the seventh eye opening.

* * * * *